Patented Dec. 27, 1932

1,892,386

UNITED STATES PATENT OFFICE

GEORGE L. DOROUGH, OF WILMINGTON, DELAWARE, ASSIGNOR TO E. I. DU PONT DE NEMOURS & COMPANY, OF WILMINGTON, DELAWARE, A CORPORATION OF DELAWARE

PREPARATION OF STYRENE

No Drawing. Application filed December 21, 1929. Serial No. 415,795.

This invention relates to the preparation of styrene and substituted styrenes. More particularly it relates to the preparation of styrene or a substituted styrene from ethyl benzene.

The making of synthetic resins by the polymerization of chemical substances is carried out by methods such as exposing a polymerizable substance to actinic light and/or to heat with or without catalysis. Many economically usable substances, in polymerizing to a resinous condition, set free water or some other volatile material during solidification. If the polymerization is carried on under pressure, the escape of these volatile substances is temporarily partially prevented, but eventually it takes place and in so doing causes the resin to check badly. On the other hand, styrene, otherwise known as vinyl benzene has the advantage that in polymerizing it passes from the liquid through the plastic to the solid state without the addition or subtraction of anything, but its previous high cost has rendered its use uneconomical.

This invention has as an object the production of styrene or its homologues or its substitution products. A still further object is the production of styrene or its homologues or a substituted styrene by a method which makes economical its use in the plastic and coating composition industries.

These objects are accomplished by the following invention which, broadly stated, consists in chlorinating the side chain of ethyl benzene or its homologue or its substitution product, in treating the chlorination product with pyridine, and in breaking down the complex formed in this step to yield styrene. It is not necessary to use chlorinated ethyl benzene as the starting material; any halogenated ethyl benzene can be used.

Within the term "substituted vinyl benzenes" or "substituted styrenes", I mean to include all vinyl benzenes in which the benzene nucleus has an hydrogen atom replaced by another element or group. By the term "a vinyl benzene" as used in the specification or claims is meant either vinyl benzene or a substituted vinyl benzene, and similarly in referring to an ethyl benzene.

My invention is carried out in three main steps, the first involving chlorination of the side chain of ethyl benzene, the second involving the formation of a complex with pyridine, and the third involving the breaking down of this complex to yield styrene and pyridine hydrochloride.

The chlorination of ethyl benzene is carried out easily by the influence of actinic light, either the ultra-violet light from a mercury arc or sunlight being particularly effective. The yields of chlorinated products in this step run as high as 98%, based on the ethyl benzene consumed. The formation of the complex is carried out by treating the chlorinated product with pyridine at a temperature lower than the decomposition point of the constituents. The removal of pyridine hydrochloride from the complex by treating the complex with heat is easily carried out and yields high percentages of unsaturated, polymerizable products.

The reactions involved in producing styrene from ethyl benzene are also exemplary of the process as applied to the production of substituted styrenes, and are as follows:

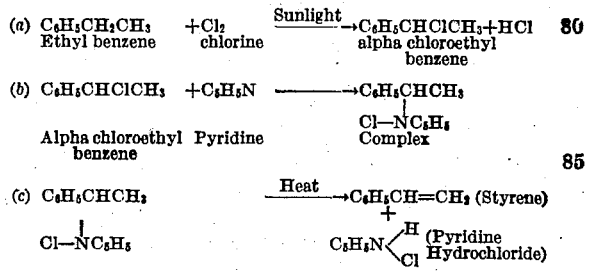

Reaction "a", involving the chlorination of ethyl benzene, is carried out by passing chlorine into ethyl benzene which is exposed to actinic light at a temperature between 1–10° C. The gas is passed in it at a rate which will not carry the temperature outside this range. At these temperatures the optimum yield is obtained but other temperatures can be used.

Reaction "b", involving the formation of the complex, is carried out by heating with agitation the alpha chloroethyl benzene and pyridine for several hours at 130–140° C. The temperatures here given are advantageous for the particular substance named because they give the optimum yield, but other temperatures may be used. For other materials other temperatures will, of course, give preferred results. In all cases the temperatures are preferably kept below the decomposition point of the products.

Reaction "c", involving the decomposition of the complex into styrene and pyridine hydrochloride, is preferably carried out at temperatures between 275° and 300° C. It is to be observed that this temperature varies with the particular complex which is being broken down, it being advantageous to carry out the reaction at temperatures above the decomposition point of the particular complex since this results in a greatly increased production of styrene. Care should be taken to prevent the liberated styrene from remaining for any long periods of time at such temperatures. A satisfactory method of accomplishing the removal is by continuous distillation under decreased pressure, as described hereinafter, so that the styrene is removed as fast as formed.

Yields of styrene have been secured by this method which were as high as 98.6% based on the chloro product consumed. The reagents used have been recovered almost quantitatively. The following examples will illustrate specific instances of the applicability of my invention.

*Example 1.—Styrene from ethyl benzene*

(a) Alpha chloroethyl benzene from ethyl benzene.

1060 gms. of carefully fractionated ethyl benzene, boiling point 136.25° at 752 mm. pressure, was chlorinated in sunlight in a pyrex flask equipped with a reflux condenser. The reaction mixture was kept within a temperature range of 1–10° C. and chlorine gas passed in below the surface of the liquid at such a rate as to keep the temperature within the specified range. The chlorination, which took place rapidly, was stopped when the reaction mixture showed an increase in weight equal to approximately eight-tenths of the molecular equivalent of chlorine required for a monochloro product (300 gms.). The reaction mixture was carefully fractionated and 898 gms. of alpha chloroethyl benzene, boiling at 89° C. at 22 mm. pressure, and 355 gms. of unchanged ethyl benzene were obtained. The residue was small. This represented a 64% absolute conversion and a 98.8% yield when calculated on the basis of ethyl benzene consumed. This product was found to be identical with the chloride obtained from methyl phenyl carbinol.

(b) Styrene (vinyl benzene) from chloroethyl benzene.

100 gms. of alpha chloroethyl benzene and 60 gms. of pyridine were heated in a reaction flask equipped with a mechanical stirrer. From the bottom of this flask a glass tube with a stop-cock led to the neck of a distilling flask which was in turn equipped with a condenser and a receiver. The reaction flask was heated in an oil bath at 130–140° C. The distilling flask, which served as a decomposition chamber, was heated in an oil bath at 275–300° C. The decomposition chamber and distillation system (condenser and receiver) were evacuated to 30 mm. As the reaction proceeded the complex addition product, a viscous liquid, settled to the bottom of the reaction flask. This was slowly drawn over through the outlet tube and allowed to drop into the evacuated decomposition chamber which was heated at 275–300° C. At this temperature the complex was decomposed into styrene and pyridine hydrochloride, and the more volatile styrene distilled over into the receiver while most of the pyridine hydrochloride remained in the flask. The small quantities of pyridine hydrochloride which distilled into the condenser were easily flushed out by water. From this representative run 72 gms. of styrene and 2.5 gms. of unchanged alpha chloroethyl benzene representing a 98.6% yield on the basis of reclaimed alpha chloroethyl benzene, were obtained.

Upon heating the water solution of the pyridine hydrochloride with calcium hydroxide the pyridine was liberated. This was extracted with benzene and recovered by fractionation of the dried benzene pyridine solution. 98% of the pyridine was recovered by this method.

*Example 2.—Chlorovinyl benzene from ethyl benzene*

1060 gms of monoethyl benzene were chlorinated in the dark at a temperature 1–10° C. using a small crystal of iodine as a catalyst for ring substitution. Chlorine gas was passed in below the surface of the cooled reaction mixture until an increase in weight of 300 gms had taken place. The reaction mixture was fractionated and 750 gms of a product distilling at 85–95° at 30 mm. pressure obtained. This was identified as a mixture of ortho and para chloroethyl benzene.

1075 gms of ortho and para chloroethyl benzene was chlorinated in sunlight at 1–10° C. as described in the case of ethyl benzene. When an increase in weight of 250 gms had been observed, the reaction was stopped and the reaction product fractionated. 750 gms of ortho and para chloro-alpha-chloroethyl benzene were obtained (boiling point 115–120° at 30 mm. pressure).

525 gms of this chloro-alpha-chloroethyl benzene and 260 gms of pyridine were heated at 130–140° C. and the resulting complex decomposed as in the case of preparation of styrene. 375 gms of ortho and para chlorovinyl benzene, boiling at 180–190° C. at 760 mm. pressure, was obtained. This represented a 78% conversion and a 97% yield if calculated on the basis of materials consumed.

*Example 3.—Divinyl benzene from diethyl benzene*

1304 gms of diethyl benzene, boiling at 181–185° at 752 mm. pressure, were chlorinated in sunlight. Temperatures of 70–90° C. were found to be most favorable for the formation of the desired di-chloro side-chain product. The chlorination was continued until an increase in weight of 510 gms had been observed. Upon fractionation 332 gms of a liquid, boiling point 130–140° at 15 mm. pressure, were obtained.

305 gms. of this di-chloro diethyl benzene were treated with 237 gms. of pyridine according to the method used for styrene and chlorovinyl benzene. 160 gms. of an unsaturated product were obtained, which upon careful fractionation yielded a product boiling between 75° and 90° C. at 10 mm. pressure. Analysis of this product showed less than 5% of chlorine to be present, this amount being evidently an impurity. The ease of polymerization substantiated the theory that two unsaturated linkages were present.

It will be apparent to persons skilled in the art that the process is susceptible of many modifications. For instance, it is not necessary to use pyridine but any organic base having basicity equal to or greater than pyridine can be used, as for instance, trimethylamine. Triethyl benzenes go through the same reactions to give ethyl and diethyl styrene.

An advantage of this invention is that vinyl benzene is produced cheaply. Another advantage of the process is that the reagents are recovered substantially quantitatively and at slight cost. A further advantage is that vinyl benzene is produced in much higher yields than had been obtained by previous processes.

As many apparently widely different embodiments of this invention may be made without departing from the spirit and scope thereof, it is to be understood that I do not limit myself to the specific embodiments thereof except as defined in the appended claims.

I claim:—

1. The method of producing a vinyl benzene consisting in forming a quaternary salt of the corresponding halogenated ethyl benzene, in separating out the quaternary salt, and in breaking down the quaternary salt.

2. The method of producing a vinyl benzene consisting in forming a complex with a halogenated ethyl benzene and an organic base, in separating out the complex, and in breaking down the complex with heat.

3. The method of producing vinyl benzene consisting in treating a halogenated ethyl benzene with an organic base having a basicity at least equal to that of pyridine to form a complex, in separating out the complex, and in breaking down the complex to form the desired vinyl benzene.

4. A method of producing vinyl benzene consisting in treating chlorinated ethyl benzene with pyridine to form a quaternary salt, in separating out the quaternary salt, and in heating the quaternary salt to yield vinyl benzene.

5. The method of producing styrene consisting in agitating chlorinated ethyl benzene with pyridine at a temperature between 130–140°, in separating the quaternary salt, and in heating the quaternary salt at a temperature between 275–300° C. under reduced pressure.

6. The method of producing vinyl benzene consisting in treating chlorinated ethyl benzene in a reaction vessel with pyridine at a temperature between 130° and 140° C. in drawing off the complex, in heating the complex at a temperature between 275 and 300° C., and in separating out the vinyl benzene.

7. The method of preparing substituted vinyl benzene from a halogenated product of an ethyl benzene consisting in treating the halogenated product of ethyl benzene with pyridine to form a complex, in separating out and breaking down the complex to form the vinyl substitution product of benzene and pyridine hydrochloride, and in heating the water solution of pyridine hydrochloride with calcium hydroxide to liberate the pyridine.

In testimony whereof, I affix my signature.

GEORGE L. DOROUGH.